2,386,709

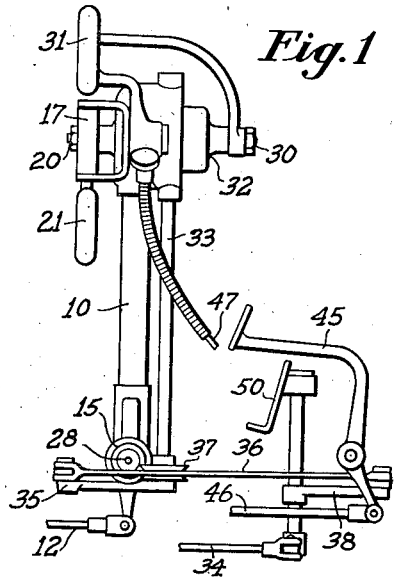
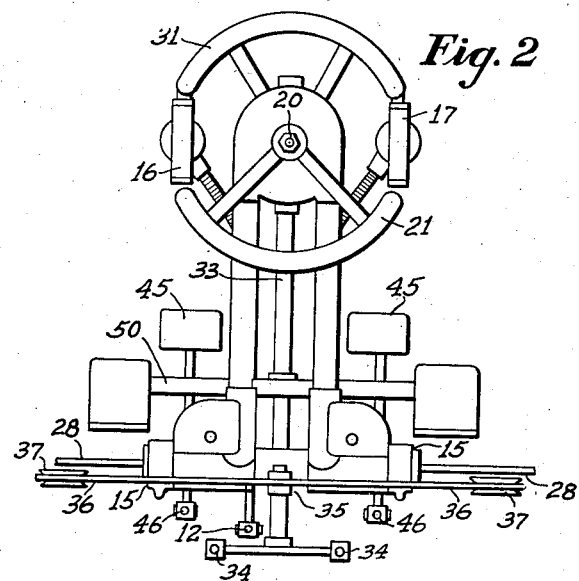
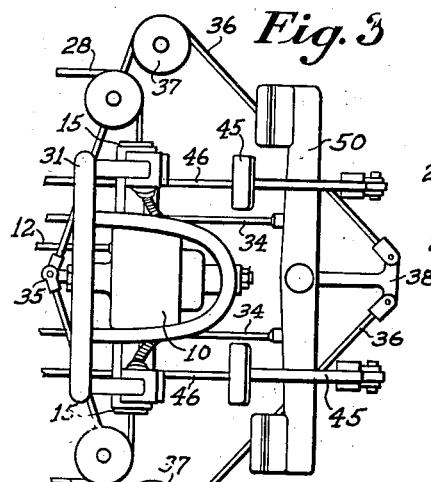
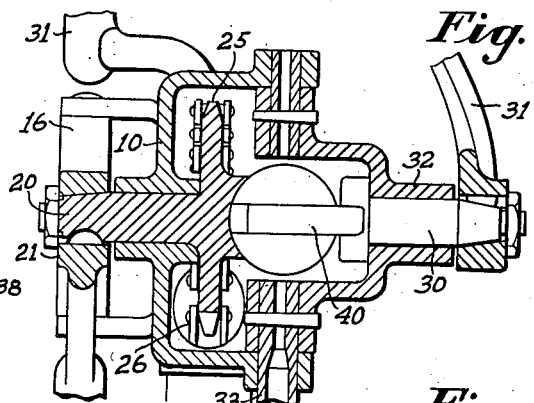
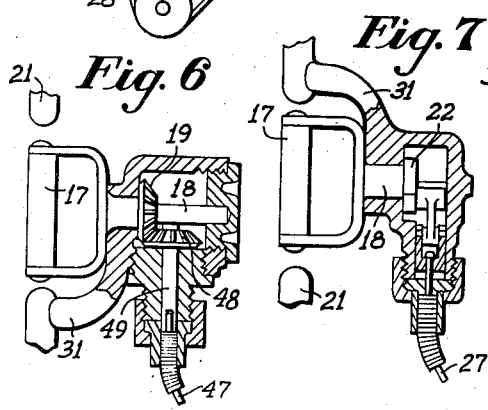
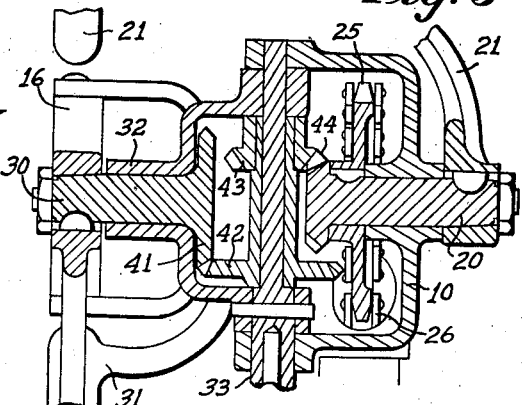
Inventor
Alden E. Osborn Patented Oct. 9, 1945

UNITED STATES PATENT OFFICE 2,386,709

AIRPLANE CONTROL MECHANISM

Alden E. Osborn, Mount Vernon, N. Y.

Application March 25, 1942, Serial No. 436,085

7 Claims. (Cl. 244—83)

The object of this invention is to provide a control mechanism whereby the elevator, rudder, ailerons and engine speed can be controlled by the hands of the operator or pilot, thus relieving him of the necessity of using the foot-operated steering control which, however, may also be provided in combination with my invention. Thus, when landing, the steering can be hand-controlled and the feet can be used for the application of one or both brakes so that the brake action can be more accurately regulated than when both steering and brakes are foot-operated.

In the drawing the parts are not shown to scale, as the drawing represents diagrammatic views to illustrate the new features of my invention without being working drawing or showing details not essential to the disclosure of the principle involved. In the specification and claims the term "longitudinal" means a direction substantially parallel with the line of travel of the airplane, while the terms "vertical" and "horizontal" also are relative and are substantially correct when the plane is in its normal flying position.

In the accompanying drawing

Fig. 1 represents a side elevation of my control mechanism,

Fig. 2 represents a rear elevation of my control mechanism looking toward the front of the airplane, Fig. 3 represents a top view of my invention, Fig. 4 represents a longitudinally sectional elevation of parts of the mechanism embodying my invention, Fig. 5 represents a longitudinal sectional elevation of a modification of Fig. 4, Fig. 6 represents a longitudinal sectional elevation of another part of my invention, and Fig. 7 represents a longitudinal sectional elevation of a modification of Fig. 6.

In the figures the column 10 is pivotally mounted at 15 on the airplane so that it can be swung backward or forward by the operator and controls the elevator either directly or by servo mechanism in the usual way, the rod 12 representing this connection. This column 10 carries at its top a shaft 20 on which is mounted a manually operated half-wheel 21 and a sprocket or pulley wheel 25 (see Fig. 4) that carries a chain 26 which connects with cables 28 that pass thru the column and around pulleys and out thru the pivotal mounting of the column and are, thereafter, connected directly or thru servo mechanism to the airplane ailerons so that the rotation of the control wheel 21 from side to side causes the movement of the ailerons in the same manner as in the usual airplane control mechanism. The column 10, however, in my mechanism also carries a second shaft 30, which shaft is mounted in the supporting member 32 pivoted on a vertical axis on the column 10 with the shaft 33 connecting with this member extending down to a point adjacent to the pivotal axis of the column. The shaft 30 is provided with a manually operated half-wheel 31 arranged so that this second half-wheel is substantially in line with the first half-wheel 21 so that the two sections 21 and 31 form a substantially complete circle. The shaft 30 is connected by a universal joint 40 (Fig. 4) or by gears 41, 42, 43 and 44 (Fig. 5) to the shaft 20, so that, while both shafts and half-wheels and the sprocket 25 revolve together, the shaft 30 and parts connected thereto are free to oscillate horizontally with the shaft 33. This vertical shaft 33 is connected thru direct mechanical connections or thru servo mechanism to the rudder so that its oscillation is communicated to the rudder and steers the airplane. In the drawing the movement of the shaft 33 is shown as being first communicated to the foot-operated rudder bar 50 by the lever 35, cable 36, pulleys 37 and lever 38, so that the foot bar is moved and its movement communicated to the rudder bar and to the usual steering connections that are operated by the rods 34. Thus, while the rudder can be controlled by the movement of the hand wheel it can also be operated by foot power when desired. The hand rudder operation, however, enables the brake pedals 45 to be mounted on the airplane independently of the rudder bar 50, thus permitting longer pedal travel, greater brake application pressure and more accurate brake control as well as simplifying the brake connections which are shown as by means of rods 46. In landing the operator could control the elevator, ailerons and rudder by his hands and use his feet to apply one or the other or both brakes without the steering control interfering with the brake operation. As it is desired to have the operator control the engine, or engines, speed and with this hand steering control it is necessary to keep both hands on the wheel, I have provided a means whereby the operator can, while keeping a firm hold of the wheel, regulate the engine speed by turning his wrists. This engine control is not intended to function as the sole control of the engine, but supplements the usual devices by regulating the speed between the maximum speed set by the regular control system down to the idling speed so that there would not be any chance of the engine reaching a speed beyond that allowed by the main control or accidently stalling the engines by the excessive movement of the wrist control which might not be easy to adjust closely. This engine control comprises mounting on the steering section of the control wheel 31, a pivoted handle 16 or two pivoted handles 16 and 17 (as shown) where multiple engines are used—one handle controlling the engine, or engines, on one side of the airplane. The handles can be connected to the engine control or throttle valve by any suitable means, but in Fig. 6 I have shown a method comprising a gear 19 on the handle shaft 18 and a gear 48 on the driving shaft 49 of the flexible shaft 47, while, in Fig. 7 I have shown a crank lever 22 on the handle shaft 18 that moves a pull wire 27 in the flexible casing. The ends of the flexible shaft 47 or wire 27 adjacent to the engine are not shown, but they can be connected to the engine throttle or engine speed-regulating means in many ways that are obvious to those skilled in the art.

The modification shown in Fig. 5 as stated above, embodies a gear system comprised of the bevel or mitre gears in place of the universal joint of Fig. 4. The gear system has the advantage of permitting the side to side turning of the part 31 of the wheel in steering thru a larger angle than is possible with the form of ball universal joint that is illustrated in Fig. 4. It should be understood, however, that other forms of universal joints can be used, as there are other forms that are less affected, than that shown, by the angular difference between the axis of the two shafts 20 and 30.

The modification shown in Fig. 5 also differs from the mechanism shown in Fig. 4 in that the shaft 30 carrying the steering part 31 of the wheel is at the front of the column 10 instead of at the back. The steering section of the wheel is also shown as the lower part instead of the upper part, as in many cases this modification would be desirable. It will be noted that, when the steering section of the wheel is turned about its vertical axis to move the rudder and is, at the same time, held from turning about its horizontal axis, the ailerons would be turned because of the gear 41 turning with the shaft 30, and thereby rotating the gears 42, 43 and 44, shaft 20 and sprocket 25, thus automatically banking the airplane for the turn without the operator turning the wheel part 31 and shaft 30 to cause the banking action. The extent of the automatic action would be determined by the ratio of movement in the gearing and the ratio of the movement between the shaft 30 and ailerons. This automatic movement does not prevent the simultaneous correcting adjustment of the ailerons by turning the control wheel part 31 about its horizontal axis. From the above it will be seen that the steering control can be either by means of the usual foot-operated bar 50 or by oscillating the steering control part 31 about its vertical pivoting on the control column. When the control of the steering of the airplane is by foot rudder operation, the operator can take hold of the wheel part 21 and control the ailerons by its rotation and the elevation by the fore and aft column position. If it is desired to steer with the hands, the operator would take hold of the wheel part 31 and steer by pushing one side forward or backward in relation to the other, the elevation being controlled by the position of the column and the ailerons by the rotation of this wheel section about the horizontal axis of the shaft 30 with the feet removed from the rudder bar 50, if desired.

I claim:

1. A control mechanism for airplanes having elevator, aileron and rudder surfaces, comprising a column pivotally mounted on a horizontal axis at right angles to the center line of the airplane, connections between said column and the elevator surfaces whereby the forward or backward movement of the upper end of said column controls the position of said elevator surfaces, a member pivotally mounted on said column on a substantially vertical axis and at right angles to the pivotal mounting of said column, connections between said member and the rudder surfaces of said airplane whereby the oscillation of said member about its said vertical axis mounting controls the position of said rudder surfaces, a shaft rotatably mounted on a substantially horizontal axis on said member at right angles to the pivotal axis of both said column and said member and adjacent to the upper end of said column and said member, connections between said shaft and the aileron surfaces of said airplane whereby the oscillation of said shaft about its said horizontal axis controls the position of said aileron surfaces, and a handle member mounted on said shaft for the manual operation of said shaft, said vertically pivoted member, and said column, said handle member being adapted to turn said horizontally mounted shaft, to cause said side to side oscillation of said vertically pivoted member and to also cause the forward or backward movement of said column, and a second manually operated means mounted on said airplane adjacent to said column but separate therefrom for moving the said rudder surfaces independently of the manual operation of said handle member.

2. A control mechanism for airplanes having elevator, aileron and rudder surfaces, comprising a column pivotally mounted on a horizontal axis at right angles to the center line of the airplane, connections between said column and the elevator surfaces whereby the forward or backward movement of the upper end of said column controls the position of said elevator surfaces, a member pivotally mounted on said column on a substantially vertical axis and at right angles to the pivotal mounting of said column, connections between said member and the rudder surfaces of said airplane whereby the oscillation of said member about its said vertical axis mounting controls the position of said rudder surfaces, a shaft rotatably mounted on a substantially horizontal axis on said member at right angles to the pivotal axis of both said column and said member and adjacent to the upper end of said column and said member, connections between said shaft and the aileron surfaces of said airplane whereby the oscillation of said shaft about its said horizontal axis controls the position of said aileron surfaces, and a handle member mounted on said shaft for the manual operation of said shaft, said vertically pivoted member and said column, said handle member being adapted to turn said shaft, to cause said side to side oscillation of said vertically pivoted member and to also cause the forward or backward movement of said column, said handle member having a manually operable means mounted thereon connected with the speed-regulating means for the propelling engine of said airplane, said manually operable engine speed-regulating means comprising a handle rotatably mounted on said handle member with its axis of rotation substantially parallel with the axis of rotation of the handle member shaft and eccentric with the axis thereof and being adapted to be actuated by the turning of the operator's wrists.

3. A control mechanism for airplanes having elevator, aileron and rudder surfaces, comprising a column pivotally mounted on a horizontal axis at right angles to the center line of the airplane, connections between the said column and the elevator surfaces whereby the forward or backward movement of the upper end of the said column controls the position of said elevator surfaces, a shaft rotatably mounted on a substantially horizontal axis on said column and fixed substantially at right angles to the pivotal axis of said column and adjacent to the upper end thereof, connections between said shaft and the aileron surfaces of said airplane whereby the oscillation of said shaft about its said horizontal axis controls the position of said aileron surfaces, a handle member mounted on said shaft for the manual operation of said shaft and said column, said handle member being adapted to turn said shaft and to cause the forward or backward movement of said column, a member pivotally mounted on said column on a substantially vertical axis at right angles to the pivotal mounting of said column, connections between said vertically pivoted member and the rudder surfaces of said airplane whereby the oscillation of said member about its said vertical axis mounting controls the position of said rudder surfaces, a second shaft rotatably mounted on a substantially horizontal axis on said vertically pivoted member and at right angles to the pivotal axis of both said column and said vertically pivoted member and adjacent to said first-mentioned shaft near the upper end of said column, a flexible connection between said first-mentioned shaft on said column and said second-mentioned shaft on said vertically pivoted member so constructed and arranged that the rotary movement of one said shafts is transmitted to the other said shaft without regard to the position of said vertically pivoted member on its said pivotal mounting on said column, and a second handle member mounted on said second-mentioned shaft for the manual operation of said second mentioned shaft, said latter handle member being adapted to turn both said shafts, to cause the side to side oscillation of said vertically pivoted member and to also cause the forward or backward movement on said column.

4. A control mechanism for airplanes having elevator, aileron and rudder surfaces, comprising a column pivotally mounted on a horizontal axis at right angles to the center line of the airplane, connections between the said column and the elevator surfaces whereby the forward or backward movement of the upper end of the said column controls the position of said elevator surfaces, a shaft rotatably mounted on a substantially horizontal axis on said column and fixed substantially at right angles to the pivotal axis of said column and adjacent to the upper end thereof, connections between said shaft and the aileron surfaces of said airplane whereby the oscillation of said shaft about its said horizontal axis controls the position of said aileron surfaces, a handle member mounted on said shaft for the manual operation of said shaft, said handle member being adapted to turn said shaft and to cause the forward or backward movement of said column, a member pivotally mounted on said column on a substantially vertical axis at right angles to the pivotal mounting of said column, connections between said vertically pivoted member and the rudder surfaces of said airplane whereby the oscillation of said member about its said vertical axis mounting controls the position of said rudder surfaces, a second shaft rotatably mounted on a substantially horizontal axis on said vertically pivoted member and at right angles to the pivotal axis of both said column and said member and adjacent to said first-mentioned shaft near the upper end of said column, a flexible connection between said first-mentioned shaft on said column and said second-mentioned shaft on said vertically pivoted member so constructed and arranged that the rotary movement of one said shafts is transmitted to the other said shaft without regard to the position of said vertically pivoted member on its said pivotal mounting on said column, and a second handle member mounted on said second shaft for the manual operation of said second shaft, said latter handle member being adapted to turn both said shafts, to cause the side to side oscillation of said vertically pivoted member and to also cause the forward and backward movement on said column, said first and second-mentioned handle members for the manual operation of said shafts being arranged in substantially the same vertical plane with one said member above the other said member whereby the handle member of said shaft on said vertically pivoted mounting can oscillate about the vertical pivotal axis of the mounting without interference with the other handle member on said vertically non-oscillatable shaft.

5. A control mechanism for airplanes comprising a column connected to the elevator surfaces of the airplane and being pivotally mounted on said airplane on a horizontal axis substantially at right angles to the center line of said airplane, said column having its upper end movable longitudinally in relation to said airplane to cause the movement of said elevator surfaces, a member connected to the rudder surfaces of said airplane and rotatably mounted on said column on a substantially vertical pivotal axis at right angles to the pivotal axis mounting of said column, said member being movable on its said vertical pivotal axis to cause the movement of said rudder surfaces, and a shaft adapted to be connected to the aileron surfaces of said airplane and being rotatably mounted on said member on a pivotal axis substantially horizontal and at right angles to the pivotal axis of both said column and member, said shaft being movable on its said horizontal pivotal axis to cause the movement of said aileron surfaces, and a means mounted on said airplane adjacent to said column but separate therefrom for moving the rudder surfaces of said plane independently of the movement of said member about its vertical pivotal axis on said column.

6. A control mechanism for airplanes comprising a column connected to the elevator surfaces of the airplane and being pivotally mounted on said airplane on a horizontal axis substantially at right angles to the center line of said airplane, said column having its upper end movable longitudinally in relation to said airplane to cause the movement of said elevator surfaces, a member connected to the rudder surfaces of said airplane and rotatably mounted on said column on a substantially vertical pivotal axis at right angles to the pivotal axis mounting of said column, said member being movable on its said vertical pivotal axis to cause the movement of said rudder surfaces, and a shaft adapted to be connected to the aileron surfaces of said airplane and being rotatably mounted on said member on a pivotal axis substantially horizontal and at right angles to the pivotal axis of both said column and said member, said shaft being movable on its said horizontal pivotal axis to cause the movement of said aileron surfaces, said longitudinal, vertical and turning horizontal movements of said parts being actuated by the hands of the operator, and means adapted to be actuated by the feet of the operator and mounted on said airplane adjacent to said column but separate therefrom for moving the rudder surfaces of said airplane independently of the movement of said member about its said vertical pivotal axis on said column.

7. A control mechanism for airplanes having elevator, aileron and rudder surfaces, comprising a column pivotally mounted on a horizontal axis at right angles to the center line of the airplane, connections between said column and the elevator surfaces whereby the forward or backward movement of the upper end of said column controls the position of said elevator surfaces, a member pivotally mounted on said column on a substantially vertical axis and adjacent to the top thereof and having a shaft extension projecting therefrom to a point adjacent to the axis of the pivotal mounting of said column on said airplane, connections between said shaft and the rudder surfaces of said airplane whereby the oscillation of said member about its said vertical axis mounting controls the position of said rudder surfaces, said connections between said shaft and said rudder surfaces adjacent said column being approximately on the line of the said pivotal axis of the column to thereby move said rudder surfaces independently of said forward or backward movement of the upper end of said column and to permit said forward or backward movement without substantially affecting the position of said rudder, a second shaft rotatably mounted on a substantially horizontal axis on said column and fixed substantially at right angles to the pivotal axis of both said column and said member and adjacent to the upper end of said column, connections between said second-mentioned shaft and the aileron surfaces of said airplane whereby the movement of said second-mentioned shaft about its horizontal axis controls the position of said aileron surfaces, and a handle member having connection to said second-mentioned shaft and adapted to be manually operated to turn said second-mentioned shaft, to cause the side to side oscillation of said vertically pivoted member and its said extension shaft, and to also cause the said forward or backward movement of said column.

ALDEN E. OSBORN.